United States Patent Office 2,993,078
Patented July 18, 1961

2,993,078
PURIFICATION OF BUTYNEDIOL
Eugene V. Hort, Westfield, N.J., assignor to General Aniline & Film Corporation, New York, N.Y., a corporation of Delaware
No Drawing. Filed Dec. 22, 1958, Ser. No. 781,948
11 Claims. (Cl. 260—637)

This invention relates to the purification of 2-butyne-1,4-diol, hereinafter referred to as butynediol, and more particularly to purification of butynediol containing formaldehyde as an impurity.

Butynediol is well known and has been commonly manufactured by the reaction of acetylene with aqueous formaldehyde solution over a suitable catalyst. The effluent solution is concentrated and by-product propargyl alcohol distilled out. The butynediol produced in this manner always contains relatively substantial amounts of formaldehyde, a typical product containing about 35% butynediol and 0.5% formaldehyde as an aqueous solution. The presence of the formaldehyde is, for many purposes and uses, highly undesirable. Thus, I have discovered that removal of this formaldehyde from the butynediol prior to its catalytic hydrogenation in known manner enables the attainment of improved yields and improved quality of butanediol or butenediol. In general, the life of the catalyst employed in such hydrogenation reaction will be improved by prior removal of formaldehyde from the butynediol because formaldehyde tends to form resinous products which cover or poison the catalyst surface. In many cases, removal of formaldehyde from the butynediol gives increased stability for products obtained therefrom.

Conventional methods of separation are difficult and expensive and do not easily effect complete or sufficient removal of formaldehyde. Neither fractional distillation at reduced pressure, nor crystallization of butynediol result in removal of formaldehyde to the desired extent unless repeated.

It is an object of this invention to provide a purifying process which will not be subject to the above disadvantages. It is another object of this invention to provide a process for removing, destroying, or nullifying the effect of formaldehyde impurity in butynediol containing same. A further object of this invention is the provision of a process for treating butynediol containing formaldehyde as an impurity to remove, destroy or nullify the effect of such impurity without damage or detriment to the butynediol. Other objects and advantages will appear as the description proceeds.

The attainment of the above objects is made possible by the present invention which broadly comprises a process for purifying butynediol containing formaldehyde as an impurity by maintaining such impure butynediol under alkaline conditions until the desired reduction in formaldehyde content is obtained. It has been found that the process of this invention effects relatively rapid purification without damage to the butynediol. It is an obviously simple and economically attractive process and its effectiveness is surprising in view of references in the literature substantiating the view that butynediol is unstable to alkalies. The commercially available aqueous solutions generally have an acid pH of about 4 to 6.

In carrying out the process of this invention, a sufficient amount of alkaline material is added to the impure butynediol to produce a pH of more than 7, preferably from about 9 to 12, and the resulting mixture then maintained under such alkaline conditions until the formaldehyde content has fallen below the maximum amount desired. Alkaline pH's below 9 are effective but too slow, and pH's above 12 require more alkali than is warranted by any increase in rate of purification or the like. The temperature of treatment is preferably from about 80 to 110° C., although any temperature from room temperature to the boiling point of the mixture is effective. However, at decreasing temperatures below the preferred range, the rate of reduction in formaldehyde content of the butynediol diminishes, so that at room temperature the purification process may require many days. Temperatures above the preferred range may in some instances lead to side reactions.

As the alkaline substance to be employed in the present process, sodium hydroxide and potassium hydroxide are preferred because of their ready availability, low cost, and high solubility in the aqueous butynediol solutions most usually requiring purification in accordance with this invention. However, other alkali or alkaline earth metal hydroxides may be employed as for example, barium hydroxide, strontium hydroxide, lithium hydroxide, or the like, or substances liberating same in the presence of the butynediol. The alkaline substance employed in any particular instance must of course be of sufficient solubility in the butynediol or its aqueous or organic solvent solution, to yield the required alkalinity.

The butynediol containing formaldehyde as an impurity which is most advantageously treated in accordance with the present invention is a crude aqueous solution, usually in about 35% butynediol concentration, as produced by the catalytic reaction of acetylene with aqueous formaldehyde solution. Such a butynediol solution may contain 0.2 to 0.6% formaldehyde or more as an impurity. However, the present process is also applicable for the treatment of aqueous or organic solvent solutions of such impure butynediol in concentrations ranging from 15% or less up to 60% or more by weight. Thus, the butynediol containing formaldehyde as an impurity may be in the form of its solution in an organic solvent such as monohydric alcohol, for example, ethyl, isopropyl, butyl or amyl alcohol, or a glycol such as ethylene glycol, propylene glycol, hexanediol, or preferably butanediol. The use of butanediol as a solvent is particularly advantageous when the purified butynediol produced by the process of this invention is to be subsequently completely hydrogenated to butanediol, since the butynediol solution produced hereby may be directly hydrogenated to produce a unitary product requiring no separation of solvent. If desired, the butynediol to be purified in accordance with this invention may be in solid form, for example as butynediol crystals containing formaldehyde as an impurity. In such instances, the temperature of the present alkaline treatment must be above the melting point of the butynediol (57.5° C.). From this it should be apparent that the butynediol treated in accordance with this invention must be in liquid form to permit intimate contact between the formaldehyde molecules and the alkaline substance employed herein.

The following examples in which parts are by weight unless otherwise indicated, are illustrative of the instant invention and are not to be regarded as limitative.

Example 1

A solution of approximately 35% crude aqueous butynediol containing 0.45% formaldehyde was brought to an initial pH of 10.5 with aqueous potassium hydroxide solution, and heated to 50° C. While held at that temperature and at hourly intervals samples were withdrawn, neutralized and submitted for analysis. The butynediol content didn't vary during the course of the experiment while the formaldehyde content declined as follows:

| Time at 50° C. hrs. | Formaldehyde concentration, percent | Time at 50° C., hrs. | Formaldehyde concentration, percent |
|---|---|---|---|
| 0 | 0.40 | 3 | 0.15 |
| 1 | 0.26 | 4 | 0.11 |
| 2 | 0.20 | 5 | 0.10 |

Example 2

260 g. of crude aqueous 35% butynediol solution containing 0.45% formaldehyde was adjusted to pH 10.4 by the addition of 15 ml. of 1 N aqueous sodium hydroxide solution. The solution was then heated at 95° C. for 1 hour after which the pH, measured at room temperature, had fallen to 8.4. The addition of 0.25 ml. of acetic acid lowered the pH to 6.5.

The product was distilled at reduced pressure giving, after an aqueous forerun, 78.3 g. (91%) of butynediol, S.P. (solidification point) 56.8° C. A 25% aqueous solution prepared from this material was colorless and gave a carbonyl number of 0.00.

A comparison distillation of 260 g. of the original butynediol solution gave 77.3 g. (90%) of butynediol S.P. 56.6° C. Its 25% aqueous solution was initially colorless but darkened more rapidly than the above-mentioned 25% aqueous solution from alkali-treated material. The carbonyl number of this 25% solution was 0.43.

Example 3

520 g. of crude aqueous 35% butynediol solution containing 0.45% formaldehyde was adjusted to pH 10.9 by the addition of 60 ml. of 1 N aqueous sodium hydroxide solution. The solution was then heated at 60° C. for 2 hours after which the pH, measured at room temperature, had fallen to 10.5.

This solution was hydrogenated to completion at 40° C. and 75 p.s.i.g. pressure using 8 g. of a Raney nickel catalyst. The product was filtered from the catalyst and distilled at reduced pressure giving, after an aqueous forerun, 154.8 g. (86%) of butanediol, S.P. 18.5°.

A comparison hydrogenation under the same conditions, but without the 2 hour pretreatment at 60° C., gave 150.2 g. (83.5%) of butanediol, S.P. 16.2°. This butanediol was yellow, while the alkali-treated run gave a colorless product.

This invention has been disclosed with respect to certain preferred embodiments and various modifications and variations thereof will become obvious to the worker skilled in the art. It is to be understood that such modifications and variations are to be included within the scope and spirit of this invention.

I claim:

1. A process for purifying 2-butyne-1,4-diol in liquid form and containing formaldehyde as an impurity comprising adding thereto an amount of an alkaline substance selected from the group consisting of alkali metal and alkaline earth metal hydroxides sufficient to reach an alkaline pH of more than 7, and maintaining the liquid 2-butyne-1,4-diol under such alkaline conditions until the desired reduction in formaldehyde content is obtained.

2. A process as defined in claim 1 wherein said alkaline conditions correspond to a pH of about 9 to 12.

3. A process as defined in claim 1 wherein said alkaline conditions are obtained by addition to the said diol of an alkali metal hydroxide.

4. A process for purifying an aqueous solution of 2-butyne-1,4-diol containing formaldehyde as an impurity comprising adding to such solution a sufficient amount of an alkaline substance selected from the group consisting of alkali metal and alkaline earth metal hydroxides to give the solution an alkaline pH of more than 7, and maintaining such solution under such alkaline conditions until the desired reduction in formaldehyde content is obtained.

5. A process as defined in claim 4 wherein said alkaline conditions correspond to a pH of about 9 to 12.

6. A process as defined in claim 4 wherein said alkaline substance is sodium hydroxide.

7. A process as defined in claim 4 wherein said alkaline conditions are carried out at a temperature of about 80 to 110° C.

8. A process for purifying an aqueous solution of 2-butyne-1,4-diol containing formaldehyde as an impurity comprising adding to said solution a sufficient amount of an alkali metal hydroxide to render the solution alkaline and maintaining said solution under such alkaline conditions at a temperature of about 80 to 110° C. until the desired reduction in formaldehyde content is obtained.

9. A process as defined in claim 8 wherein said alkaline conditions correspond to a pH of about 9 to 12.

10. A process as defined in claim 8 wherein the initial diol solution to be purified contains about 35% of 2-butyne-1,4-diol and about 0.2 to 0.6% of formaldehyde.

11. A process for purifying an aqueous solution containing about 35% of 2-butyne-1.4-diol and about 0.2 to 0.6% of formaldehyde as an impurity comprising adding to such solution a sufficient amount of sodium hydroxide to produce therein a pH of about 9 to 12, and heating the resulting alkaline solution at a temperature of about 80 to 110° C. until the desired reduction in formaldehyde content is obtained.

References Cited in the file of this patent

UNITED STATES PATENTS 2,801,160   Iserson _____ July 30, 1957

FOREIGN PATENTS 698,019   Great Britain _____ Oct. 7, 1953
890,795   Germany _____ Sept. 21, 1953